United States Patent Office 2,776,713
Patented Jan. 8, 1957

2,776,713

CEMENTING OF WELLS

Bryan E. Morgan and Charles L. Prokop, Houston, Tex., assignors, by mesne assignments, to Esso Research and Engineering Company, Elizabeth, N. J., a corporation of Delaware No Drawing. Application September 30, 1954,
Serial No. 459,520

20 Claims. (Cl. 166—22)

The present invention is directed to an improved cementing composition for oil and gas wells, and the like. More specifically, the invention is directed to an improved composition and a method for using same in cementing oil and gas wells, and the like. In its more specific aspects, the invention is directed to an improved cementing composition having a low fluid loss and a method for using same in well bores.

The present invention may be briefly described as a cementing composition for oil and gas wells and the like which comprises a slurry of cement in a hydrocarbon and a filtration reducing amount of Bentone.

The invention also involves a cementing method in which oil and gas wells, and the like, are cemented by pumping or forcing a slurry of cement into a well bore penetrating an earth formation. Pressure is then imposed on the slurry in excess of formation pressure to force a portion of the slurry at least into contact with the formation; solids are deposited from the slurry and excess cement slurry is then removed from the well bore while maintaining the pressure. Water is then forced through the deposited solids into the formation to set the cement. The slurry is comprised of Portland cement, Bentone in a filtration reducing amount and oil. This composition will set up when contacted with water.

The hydrocarbon employed in the composition and the method may suitably be crude petroleum and fractions thereof; for example, the fractions may be a heavy naphtha, such as one boiling from about 300° to 600° F., kerosene, diesel oil, light lubricating oil fractions and the like.

The cement employed in the present invention may suitably be Portland cement but may include other cementing materials, such as pozzolan and lime mixture, and sand and lime mixture, which may be especially useful in deep well cementing. It is anticipated that plaster of Paris, and the like may be used in shallow wells and for special jobs. The cement may be used in amounts in the range from about 50 to about 700 lbs. per bbl. of oil with good results being obtained in amounts ranging from about 100 to about 600 lbs. per bbl. of oil.

The Bentone employed in the present invention may be used in amounts from about 2 to about 10 pounds per barrel of oil.

Bentone is the reaction product of organic bases with bentonite. The reaction is a base exchange reaction. Bentone may be prepared by treating a water slurry of high-grade sodium bentonite with one of the larger quaternary ammonium complexes, for example the water soluble salts, such as octadecylammonium chloride or dioctadecylammonium chloride, and the like. An ion exchange reaction takes place to produce a flocculated organophilic bentonite. This product, commonly called a Bentone, is recovered by filtering, washing, drying, and re-grinding. A description of the Bentones may be found in Chemical Engineering, March 1952, pages 226 to 230.

It may be desirable in the practice of the present invention to use effective amounts in the range of about 3 lbs. per barrel of oil or less of a solvation agent.

The solvation agent employed in the practice of the present invention is used in the sense of the solvation agent referred to in the paper "Organophilic Bentonites. Swelling in Organic Liquids" by John W. Jordan, The Journal of Physical & Colloid Chemistry, vol. 53, No. 2, February 1949, and in the article "Organophilic Bentonites. II—Organic Liquid Gels" by J. W. Jordan, B. J. Hook and C. M. Finlayson, The Journal of Physical & Colloid Chemistry, vol. 54, No. 8 November 1950. Thus as the oil and Bentone are mixed, the oil moves into the interstitial spaces of the Bentone aggregate causing the Bentone particles to swell; the principal function of the solvation agent may be to speed up the movement of the oil into the interstitial spaces. The solvation agent may suitably be an aliphatic alcohol, such as methyl alcohol, ethyl alcohol, propyl and butyl alcohols and the like. As examples of other suitable solvation agents may be ethylene glycol monomethyl ether, diethylene glycol monoethyl ether, the ketones, such as acetone, methyl ethyl ketone and other ketones of the same homologous series.

It may also be desirable under some circumstances to employ effective amounts in the range of about 1 lb. per barrel of oil or less of a dispersing agent to thin the composition in the practice of the present invention and dispersing agents, such as the metallic soaps of the fatty acids as exemplified by lead naphthenate, copper stearate, lead oleate, cobalt oleate and other heavy metal salts of the fatty acids may be used. As the Bentone swells, the attraction between Bentone aggregates increases, the slurry tends to thicken and the viscosity and gel strength to increase; if this change is sufficiently large that the slurry becomes difficult to handle, it may be controlled by the introduction of a heavy metal salt of fatty acid which may be adsorbed on the Bentone-oil aggregates; thus these heavy metal salts and fatty acids act as dispersing agents in the present invention.

In practicing the present invention for cementing wells, a slurry of the cement, Bentone and oil is pumped into the well through a tubing which extends at least to a formation or perforations in a well casing. The cementing operation is performed by imposing pressure on the slurry to cause the slurry to be forced at least into contact with or into the formation and/or into the perforations. Cement solids are deposited behind the casing in contact with the formation and in the perforations of the casing by the process of controlled filtration of the oil from the slurry. Throughout this operation the pressure inside the casing is maintained in excess of formation pressure. After at least a portion of the cement solids has been deposited in the perforations and/or against the formation or in contact therewith, excess cement slurry is removed from the well casing by reverse circulation. Water is flowed down the casing or well bore and the excess cement is reversed up the tubing. If desired, a tubular extension member may be lowered through the tubing or a suitable cement plug cutting tool may be employed to place and/or reverse out the cement. As the water replaces the cement in the casing, the pressure maintained in excess of the formation pressure causes a portion of the water to be forced through the perforations which contain the deposited cement solids and through the deposited cement solids behind the casing to cause the cement to set up. As soon as the water comes in contact with the deposited cement solids, hydration starts, strength begins to develop, and the permeability begins to decrease.

It is contemplated that surface active agents, such as those that promote water-wetting, may be used in the flush water in effective amounts of about 3 pounds per barrel of water or less to hasten the wetting of the cement particles. As soon as the cement begins to set, the water flow into the formation is diminished and strength develops in the mass to form a complete job. Thereafter, as desired, the casing and/or formation may be reperforated by lowering a gun perforator in the well through the tubing.

It is to be noted that the improved cement slurry of the present invention forms a filter cake against the formation and/or in the perforations of the casing which allows water to filter therethrough and contact the cement to cause a setting-up action. It is contemplated in the practice of the present invention that under some circumstances it may be desirable to allow the cement to set up by contact with interstitial water. In other words, the water existing in the formation may cause the cement to set up as desired. Under these circumstances, it would be unnecessary to force water from the well bore through the filter cake but the pressure in the well bore would be diminished and formation pressure would be allowed to force water into the filter cake of cement.

In this application, it may be advantageous to add small amounts (about 3 lbs. per barrel of oil or less) of surface active agents that promote water-wetting into the oil, cement, and Bentone suspension.

The invention will be further illustrated by reference to the following examples:

Compositions containing 250 pounds of cement per barrel of diesel oil were made up to which 10 pounds of Bentone per barrel of oil was added. Methanol was used in the compositions as a solvation agent for the Bentone; lead naphthenate was used as a dispersing agent to reduce the gel strength of the compositions. These compositions were then tested to determine the density, viscosity and API fluid loss. The results of these tests are presented in Table I in which the compositions are also set out.

TABLE I

*Properties of oil-cement composition*

| Materials added to Diesel oil, lbs. per bbl. | | | | Slurry Density, lbs./gal. | Properties of oil-cement compositions | | | Remarks |
|---|---|---|---|---|---|---|---|---|
| Portland cement [1] | Bentone | Methanol | Lead naphthenate | | Viscosity, cps. | Yield Point, lbs/100 sq. ft. | 30-min. API water loss, cc. | |
| 250 | 0 | 0 | 0 | ---- | -- | -- | ([2]) | Poor suspension. Settled quickly. |
| 250 | 10 | 3 | 0 | 10.5 | 12 | -- | 60 | Good suspension. No settling. |
| 500 | 10 | 3 | 0 | 12.9 | 33 | 59 | -- | Good suspension but gel strength high. |
| 500 | 10 | 3 | 0.5 | 12.9 | 35 | 20 | [3] 89 | Same as above except lower gel strength. |

[1] Lone Star normal Portland cement.
[2] 203 cc. in 2½ minutes.
[3] Filter cake set up after water was filtered through the cake.

It will be seen from the data in Table I that a composition containing 250 pounds of cement per barrel of diesel oil had an API fluid loss of 203 cc. in 2½ minutes when a pressure of 100 p. s. i. was applied thereto. When 10 pounds of Bentone and approximately 3 pounds of methanol were added to the composition, the fluid loss was reduced to 60 cc. in 30 minutes. The methanol was added to aid in the solvation of the Bentone in the oil.

The slurries containing Bentone besides having a reduced filtration have desirable properties of viscosity and gel strength which aid in the suspension of the cement particles. Lead naphthenate may be added to the suspension to reduce gel strength in the heavier slurries.

Additional compositions were made up in which amounts of Portland cement range from 100 to 600 pounds per barrel of kerosene and containing 2 to 10 pounds of Bentone per barrel of kerosene were used. The several compositions contained methanol and lead naphthenate as solvation agents and dispersing agents, respectively. The several compositions were tested for density, viscosity, yield-point, settling characteristics and fluid loss. The results of these tests, giving the characteristics of the compositions are set out in Table II.

TABLE II

*Effect of bentone, methanol and lead naphthenate on properties of oil-cement slurries*

| Materials Added to Kerosene; lbs. per bbl. | | | | Slurry Density, lbs./gal. | Viscosity, cps. | Yield Point, lbs./100 sq. ft. | Settling, Percent by vol.[4] | Fluid Loss: cc. API | | | | Remarks |
|---|---|---|---|---|---|---|---|---|---|---|---|---|
| Portland Cement[1] | Bentone[2] | Methanol | Lead Naphthenate[3] | | | | | 1 min. | 3 min. | 5 min. | 7½ min. | |
| 400 | 0 | 0 | 0 | 11.8 | 22 | 70 | no test | Blew Air in 20 sec.—150 cc. | | | | Some oil noted on surface of slurry. |
| 500 | 0 | 0 | 0 | 12.8 | 25 | 183 | no test | Blew Air in 20 sec.—120 cc. | | | | Slurry was very thick. Some oil on Surface. |
| 600 | 0 | 0 | 0 | 13.6 | no test | no test | no test | Blew Air in 20 sec.—90 cc. | | | | Slurry too thick to measure. |
| 100 | 2 | 2.8 | 0 | 8.3 | 8 | 0 | 50 | 52 | 93 | 122 | 152 | |
| 100 | 4 | 2.8 | 0 | 8.3 | 9 | 2 | 28 | 19 | 36 | 49 | 62 | |
| 100 | 6 | 2.8 | 0 | 8.3 | 10 | 10 | 9 | 12 | 21 | 28 | 35 | |
| 100 | 8 | 2.8 | 0 | 8.3 | 14 | 24 | 2 | 9 | 17 | 22 | 28 | |
| 100 | 10 | 2.8 | 0 | 8.3 | 10 | 56 | 1 | 7 | 14 | 18 | 23 | |
| 400 | 0 | 0 | 0.5 | 11.8 | 11 | 0 | 42 | 123 | ---- | ---- | ---- | Blew Air in 2 min.—197 cc. |
| 400 | 4 | 2.8 | 0.5 | 11.8 | 11 | 3 | 18 | 42 | 82 | 109 | 137 | Cement Filter Cakes set in 24 hrs. at 170° F.[5] |
| 400 | 6 | 2.8 | 0.5 | 11.8 | 11 | 11 | 10 | 27 | 52 | 69 | 86 | |
| 400 | 8 | 2.8 | 0.5 | 11.8 | 11 | 26 | 4 | 16 | 31 | 41 | 52 | |
| 400 | 10 | 2.8 | 0.5 | 11.8 | 13 | 101 | 0 | 15 | 26 | 35 | 43 | |
| 600 | 4 | 2.8 | 0.5 | 13.6 | 22 | 52 | 5 | 75 | ---- | ---- | ---- | Blew Air in 2 min. 5 sec.—110 cc. |
| 600 | 6 | 2.8 | 0.5 | 13.6 | 28 | 52 | 3 | 32 | 58 | 75 | 94 | |
| 600 | 6 | 2.8 | 1.0 | 13.6 | 25 | 0 | 10 | 15 | 36 | 51 | 67 | |
| 600 | 8 | 2.8 | 1.0 | 13.6 | 26 | 13 | 4 | 18 | 36 | 48 | 59 | |

[1] El Toro normal Portland cement.
[2] Bentone 34, a product developed by National Lead Company, New York, N. Y.
[3] A 24% solution of lead naphthenate.
[4] Test made in 50 cc. graduated cylinder and measuring fluid on surface of slurry after standing approximately 18 hours.
[5] Cement filter cakes treated with following fluids by forcing fluids through cakes under pressure: (a) Tap water; (b) 1% solution—"CETAB"—cetyl trimethyl ammonium bromide (a cationic agent); (c) 1% solution—Tween 40—polyoxyethylene sorbitan monopalmitate (a nonionic agent); (d) 1% solution—Triton X—200—diiso butyl phenoxypolyethoxy sodium sulfonate (an anionic agent). All set hard within 24 hrs. in 170° F. water bath It will be seen from these data that the slurries have low density in comparison to conventional slurries prepared with water. The viscosity, yield point and settling properties were controlled satisfactorily by the use of Bentone and lead naphthenate. It is to be noted that when pressures of 100 p. s. i. were imposed on the several slurries quite desirable results were obtained with slurries containing 2 to 10 pounds of Bentone per barrel of oil with slurries containing from 100 to 600 pounds of Portland cement. Also it is to be noted that very low fluid losses were observed for the several slurries in accordance with the present invention.

The composition and method of the present invention are of considerable advantage and utility in the oil and/or gas industry since difficulties may be encountered when water-base cementing compositions are employed because water-base compositions may set up prematurely and cement the tubing inside the casing. When this occurs, valuable time is lost in retrieving the tubing and cleaning out the borehole.

The present invention is also advantageous in that the water need not be employed until it is desired to cause the cement to set up in the well bore.

This application contains matter which is common to an application filed September 30, 1954, for William T. Ilfrey and Charles L. Prokop, Ser. No. 459,519, and entitled "Method of Drilling Wells."

The nature and objects of the present invention having been completely described and illustrated, what we wish to claim as new and useful and to secure by Letters Patent is:

1. A cementing composition for oil and gas wells, and the like, which consists essentially of a slurry of cement in a hydrocarbon and an amount of the reaction product resulting from treating a water slurry of sodium bentonite with one of the larger quaternary ammonium complexes, said cement and said reaction product being present in amounts in the range between about 50 and about 700 pounds and in the range between about 2 and about 10 pounds respectively per barrel of hydrocarbon, said cement being selected from the group consisting or Portland cement; pozzolan and lime mixture; sand and lime mixture; and plaster of Paris.

2. A composition in accordance with claim 1 in which the hydrocarbon is kerosene.

3. A composition in accordance with claim 1 in which the hydrocarbon is diesel oil.

4. A composition in accordance with claim 1 in which the hydrocarbon is crude oil.

5. A cementing composition for oil and gas wells, and the like, which consists essentially of a Portland cement, the reaction product resulting from treating a water slurry of high-grade sodium bentonite with one of the larger quaternary ammonium complexes, and oil, said Portland cement and said reaction product being present in amounts in the range between about 50 and about 700 pounds and in the range between about 2 and about 10 pounds, respectively, per barrel of oil.

6. A composition in accordance with claim 5 in which the oil is diesel oil.

7. A composition in accordance with claim 5 in which the oil is kerosene.

8. A cementing composition for oil and gas wells and the like which consists essentially of Portland cement, the product resulting from treating a water slurry of high-grade sodium bentonite with one of the larger quaternary ammonium complexes, oil and a solvation agent for said reaction product, said Portland cement and said reaction product being present in amounts in the range between 50 and 700 pounds and in the range between 2 and 10 pounds, respectively, per barrel of oil.

9. A cement composition for oil and gas wells and the like which consists essentially of Portland cement, the reaction product resulting from treating a water slurry of high-grade sodium bentonite with one of the larger quaternary ammonium complexes, oil, an effective amount of a dispersing agent, and an effective amount of a solvation agent for said reaction product, said Portland cement and said reaction product being present in amounts in the range between about 50 and about 700 pounds and in the range between about 2 and about 10 pounds, respectively, per barrel of oil.

10. A composition in accordance with claim 9 in which the dispersing agent is lead naphthenate.

11. A method for cementing oil and gas wells, and the like, which comprises pumping a slurry of Portland cement, the reaction product resulting from treating a water slurry of high-grade sodium bentonite with one of the larger quaternary ammonium complexes, and oil into a well bore penetrating an earth formation, said cement, oil and reaction product being present in said slurry in sufficient amounts to form a filter cake, imposing pressure on said slurry in excess of formation pressure to force a portion of said slurry at least into contact with the formation and to deposit cement solids, removing excess cement slurry from the well bore while maintaining said pressure, and then forcing water through the portion of the deposited solids to set said cement.

12. A method for cementing oil and gas wells, and the like, which comprises pumping a slurry of Portland cement, the reaction product resulting from treating a water slurry of high-grade sodium bentonite with one of the larger quaternary ammonium complexes, and oil into a well casing penetrating an earth formation adjacent perforations in said casing, said cement, oil and reaction product being present in said slurry in sufficient amounts to form a filter cake, imposing pressure on said slurry in excess of the formation pressure to force a portion of the slurry at least into the perforations and to deposit cement solids therein, removing excess cement slurry from the well casing while maintaining said pressure, and then forcing water through the portion of the cement solids deposited from the slurry in the perforations to set said cement.

13. A method for cementing oil and gas wells, and the like which comprises pumping a slurry of Portland cement, the reaction product resulting from treating a water slurry of high-grade sodium bentonite with one of the larger quaternary ammonium complexes, and oil into a well casing penetrating an earth formation adjacent perforations in said casing, said cement, oil and reaction product being present in said slurry in sufficient amounts to form a filter cake, imposing pressure on said slurry in excess of the formation pressure to force a portion of the slurry at least into the perforations and to deposit cement solids, and circulating an aqueous washing liquid in said well casing to remove excess cement slurry from the well casing while maintaining said pressure, at least a portion of said aqueous washing liquid being forced through the portion of the cement solids deposited in the perforations to set said cement.

14. A method in accordance with claim 13 in which the aqueous washing liquid is water.

15. A method for cementing oil and gas wells and the like which comprises pumping a slurry of Portland cement, the reaction product resulting from treating a water slurry of high-grade sodium bentonite with one of the larger quaternary ammonium complexes in a filtration reducing amount, and oil into a well casing penetrating an earth formation adjacent perforations in said casing, said cement and said reaction product being present in amounts in the range between 50 and 700 pounds and in the range between 2 and 10 pounds, respectively, per barrel of oil, imposing pressure on said slurry in excess of the formation pressure to force a portion of the slurry at least into the perforations and behind the casing to deposit cement solids, removing excess cement slurry from the well casing while maintaining said pressure, and then forcing water through the deposited solids to set the cement.

16. A method in accordance with claim 15 in which the slurry contains a solvation agent for said reaction product.

17. A method in accordance with claim 15 in which the slurry contains a dispersing agent.

18. A method in accordance with claim 15 in which the slurry contains effective amounts of a solvation agent for said product and effective amounts of a dispersing agent.

19. A method for cementing oil and gas wells and the like which comprises pumping a slurry of cement, the reaction product resulting from treating a water slurry of high grade sodium bentonite with one of the larger quaternary ammonium complexes, and oil into a well bore penetrating an earth formation, said cement, oil and reaction product being present in said slurry in sufficient amounts to form a filter cake, said cement being of the group consisting of Portland cement; pozzolan and lime mixture; sand and lime mixture; and plaster of Paris, imposing pressure on said slurry in excess of formation pressure to force a portion of said slurry at least into contact with the formation and to deposit cement solids, removing excess cement slurry from the well bore while maintaining said pressure and then forcing water through the portion of the deposited solids to set said cement.

20. A method for cementing oil and gas wells and the like which comprises pumping a slurry of cement, the reaction product resulting from treating a water slurry of high grade sodium bentonite with one of the larger quaternary ammonium complexes in a filtration reducing amount, and oil into a well casing penetrating an earth formation adjacent perforations in said casing, said cement and Bentone being present in amounts in the range between 50 and 700 pounds and in the range between 2 and 10 pounds, respectively, per barrel of oil, said cement being of the group consisting of Portland cement, pozzolan and lime mixture; sand and lime mixture; and plaster of Paris, imposing pressure on said slurry in excess of the formation pressure to force a portion of the slurry at least into the perforations and behind the casing to deposit cement solids, removing excess cement slurry from the well casing while maintaining said pressure and then forcing water through the deposited solids to set said cement.

References Cited in the file of this patent

UNITED STATES PATENTS

| 1,601,295 | Collings | Sept. 28, 1926 |
| 1,772,999 | Huber | Aug. 12, 1930 |
| 2,188,767 | Cannon et al. | Jan. 30, 1940 |
| 2,320,633 | Mitchell et al. | June 1, 1943 |
| 2,393,173 | Larsen | Jan. 15, 1946 |
| 2,531,812 | Hauser | Nov. 28, 1950 |
| 2,582,459 | Salathiel | Jan. 15, 1952 |
| 2,705,050 | Davis et al. | Mar. 29, 1955 |